United States Patent Office 2,715,598
Patented Aug. 16, 1955

2,715,598

METHODS OF JOINTING SURFACES BY HEAT-HARDENING RESINS

John Rees and Harold John Pollard, Bristol, England, assignors to The Bristol Aeroplane Company, Limited, Bristol, England, a British company Application December 7, 1953, Serial No. 396,552

Claims priority, application Great Britain December 16, 1952

15 Claims. (Cl. 154—126)

This invention relates to methods of jointing surfaces by heat-hardenable resins.

In spite of many attempts at its solution, the problem of providing an adhesive capable of forming strong joints between surfaces at least one of which is formed at least in part by one or more fully cured heat-hardenable resins such as phenol-, urea-, cresol-, aniline- and melamine-formaldehyde products still remains troublesome. Processes have been proposed for this purpose in which a heat-hardenable resin material, for example a phenol-formaldehyde condensation product, by itself or in conjunction with a thermoplastic substance for example, polyvinyl acetol or an aromatic amine-formaldehyde condensation product, is distributed between the joint faces and the latter are then pressed together and heated to a temperature sufficient to harden the heat-hardenable resins.

The heat necessary for the process has been supplied through heated platens or shaped mould members which also apply the pressure or, where the shape of the assembly precludes this, the assembly has been subjected to pressure in an autoclave using a rubber blanket technique or other means, the heat being supplied for example, by electrical resistance heating elements arranged adjacent the joint. In any case, the heat is conducted through the components of the assembly to the joint surfaces. Whether due to the poor heat conductivity or some other property of the heat-hardened resinous materials or to the trapping of steam in the joint, we have not found such processes to produce very reliable joints and frequently it has been found that the members on which the joint surfaces are formed are blistered by vaporisation of absorbed moisture unless they are subjected to a very thorough drying process beforehand. On the other hand, we have found that very good joints can be made if heat at a sufficient intensity is produced actually in the joint.

The present invention accordingly consists in a method of jointing two surfaces together face to face at least one of said surfaces being formed at least in part by a fully cured heat-hardened resin, which method comprises introducing a layer comprising a heat-hardenable adhesive and an electrical conductor, between said surfaces, pressing the surfaces together, and causing an electric current to pass along said conductor to generate sufficient heat to harden the heat-hardenable adhesive of said layer.

According to a feature of the present invention said electrical conductor may comprise a perforate or imperforate metal foil, a metal wire mesh or the like.

When a large number of identical joints have to be made it is preferred to have said electrical conductor carried by a solid film of material composed, at least in part, of a heat hardenable resin which takes part in the formation of the joint, or of a solid film composed of a material which disperses out of the joint when the joint is heated by the electrical conductor.

By way of example, the present invention will be described as applied to adhesively uniting the upper and lower moulding which together constitute the variable incidence wing described in the specification accompanying United States patent application Serial No. 348,272, now abandoned.

Figure 2:
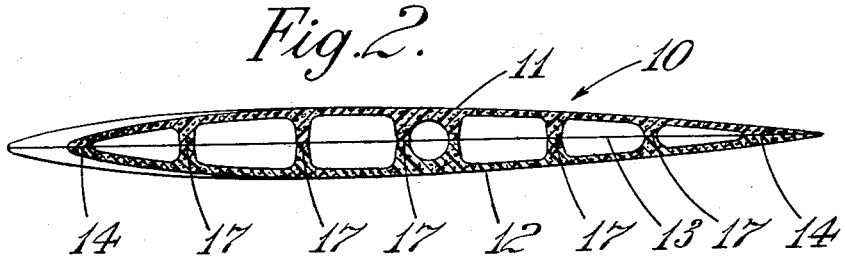
Figure 2 is a cross-section of the wing on line 2—2 of Figure 1.

Referring to the drawings, the variable incidence wing, generally indicated at 10, comprises an upper moulding 11 and a lower moulding 12 adhesively united together as shown in Figure 2. Each moulding is composed of fibrous material bonded with heat-hardened resin, and the mouldings are substantially identically dimensioned and lateral inversions of each other in the plane 13 (Figure 2) passing through the leading and trailing edges of the wing, 10. Furthermore, each moulding 11, 12 is of generally shallow dished form having flat surfaces 14 at its leading and trailing edges lying in the plane 13, while within the dished portion of each moulding are integrally formed five spanwise extending spars 15 and three chordwise extending ribs 16, the free edges of the ribs and spars having surfaces 17 lying in the plane 13.

It is the surfaces 14 and 17 of the mouldings 11, 12 which have to be jointed together face to face as shown in Figure 2 and the following two examples describe how this may be done in accordance with the present invention.

*Example 1*

Figure 1:
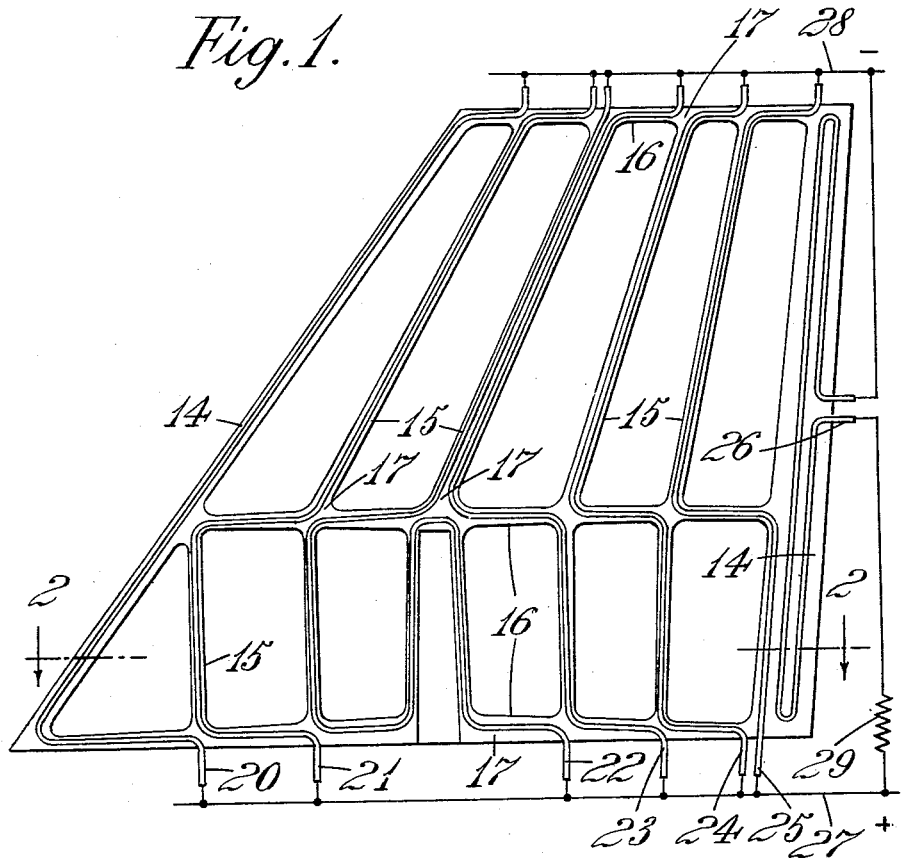
Figure 1 is a plan view of one of the mouldings.

The surfaces 14 and 17 of the mouldings which are to be jointed together are first machined to provide true and smooth joint surfaces between the mouldings. The machined surfaces 14 and 17 are then coated with a heat-hardenable adhesive, of which several suitable proprietary brands are commercially available. For this purpose adhesives of the epoxy or ethoxylene resin type have been found satisfactory. The invention can also be used in conjunction with known adhesive processes using a heat hardenable resin in conjunction with a thermoplastic resin. A number of electrical conductors 21, 22, 23, 24, 25, 26 are then placed along the surfaces 14 and 17 of one of the mouldings as shown in Figure 1. The conductors 21 to 26 each comprise a strip of imperforate metal foil, and the conductors are wired in parallel between the main supply conductors 27 and 28 arranged one along each side of the moulding. Various arrangements of the conductors 21 to 26 are of course possible. In the specific example now being given, it will be seen from Figure 1 that one conductor is arranged to extend along each portion of the thin spars 15 and the ribs 16, while the central thicker spar 15 has two conductors side by side. Likewise, while the thinner leading edge surface 14 has one conductor extending along it, the wider trailing edge surface 14 has two conductors arranged on its portion towards the tip of the wing and three conductors on its portion towards the inboard end of the wing.

According to the shape of the surfaces to be united, the arrangement of the conductors may be selected as desired, the main aim being to keep all the conductors to about the same length and resistance per unit length. However, when necessary, the resistance per unit length of any one conductor may be varied by varying the gauge or width of the metal foil strip forming the conductor so as to obtain the required heat input at any particular part of the joint. Also, the heat input of any one conductor, for example 26, may be varied by means of an external resistance such as 29 wired in series with the conductor.

It is to be understood that the area of the joint surface covered by the electrical conductors may be less than the total area of the joint surface. As a specific example, it has been found that with a joint surface about ½ in. wide, a strip of metal foil of about ⅛ in. wide placed along the longitudinal centreline of the surface is sufficient to produce the required input of heat at that part of the joint.

When the conductors 20 to 26 have been placed in position the mouldings 11 and 12 are brought together under a pressure as shown in Figure 2. In the example now being given, a pressure to the order of 100–200 lbs. per square inch has been found to be satisfactory. At the same time, an electrical current is passed through the conductors 20 to 26, the current through each conductor being of sufficient intensity to raise the temperature between the surfaces 14 and 17 to a value appropriate for the curing of the heat-hardenable resin layer.

After a suitable curing period, for example, ten minutes, the current is interrupted and the mouldings 11, 12 allowed to cool. The mouldings are preferably allowed to cool to below 60° C. whereafter the pressure is removed, the joint between the mouldings then being completed.

Example II

When a large number of identical joints have to be made, it is convenient to have the electrical conductors, for example, 20 to 26 carried by a solid film of material composed at least in part of a partially cured heat-hardenable resin which takes part in the formation of the joint or a solid film composed of a material which will disperse out of the joint when the joint is heated by the electrical conductors. The electrical conductors and the solid film of material are then in the form of a gasket which may easily be introduced between surfaces to be jointed.

When the invention is used with one of the known adhesive processes employing a heat-hardenable resin in conjunction with a thermoplastic substance, the latter may be in the form of a film carrying the electrical conductors the film carrying the conductors taking part in the formation of the joint.

As another example of a solid film carrying the electrical conductors and taking part in the formation of the joint, the solid film may comprise the conductors 20 to 26 arranged between two sheets of thin felted or woven fibrous material impregnated and stuck together with a partially cured water-soluble phenol formaldehyde resin, or another such thermosetting resinous material which is solid at normal room temperature but when heated first becomes fluid and then solidifies as curing takes place.

In yet another example, the electrical conductors may be carried by a film of polyethylene. In this case, when the joint is heated by the electrical conductors, the polyethylene film is dispersed out of the joint and takes no part in the jointing of the surfaces.

Where the surfaces to be jointed together are of considerable area, instead of metal foil strips as electrical conductors, the electrical conductors may take the form of a sheet of perforate or imperforate metal foil or a network of wire mesh or parallel wires, the conductors being arranged to produce the required distribution of heating in the joint.

Where such conductors form one or more closed circuits in the joint, the heating current may be generated in the conductors by the application of an alternating electro-magnetic field to the conductors. This means of heating the joint is not usually as convenient as applying a difference of potential to the ends of one or more conducting paths however.

We claim:

1. A method of assembling an assemblage comprising two fully cured heat-hardenable resin bonded mouldings, said mouldings each having a plurality of surfaces which are to be adhesively jointed each to a surface on the other moulding to form the assemblage, which method comprises introducing between each pair of surfaces a layer of heat-hardenable adhesive and between all said surfaces of one moulding and all said surfaces of the other moulding a plurality of thin strip-like electric conductors, said conductors being arranged with at least one conductor between each pair of said surfaces to be jointed and none of the conductors crossing any one of the conductors at any point, pressing said pairs of surfaces together and causing electric current to pass along all said conductors to generate sufficient heat to harden said heat-hardenable adhesive.

2. A method of assembling an assemblage comprising two fully cured heat-hardenable resin bonded mouldings, said mouldings each having a plurality of surfaces which are to be adhesively jointed each to a surface on the other moulding to form the assemblage, which method comprises introducing between each pair of surfaces to be jointed a layer of heat-hardenable adhesive, and between all said surfaces on one moulding and all said surfaces on the other moulding a plurality of strip-like electric conductors composed each of a ribbon of metal foil, said metal foil conductors being connected in parallel with each other with at least one metal foil conductor between each pair of surfaces to be jointed, and none of the metal foil conductors crossing any one of the metal foil conductors at any point, said metal foil conductors being all of substantially the same length and substantially the same resistance per unit length, pressing said pairs of surfaces together and causing electric current to pass along all said conductors to generate sufficient heat to harden said heat-hardenable adhesive.

3. A method as claimed in claim 1, wherein said strip-like conductors are carried by a solid sheet of material in the form of a gasket which solid sheet of material comprises an adhesive substance which takes part in the formation of the joints between said pairs of surfaces, said sheet of material having surfaces corresponding to and coextensive with, all said surfaces on the two mouldings.

4. A method as claimed in claim 3, wherein said solid sheet of material comprises two sheets of fibrous material impregnated with an adhesive substance, said thin strip like conductors being carried between the impregnated sheets of fibrous material.

5. A method as claimed in claim 3, wherein said solid sheet of material comprises a film of thermoplastic resin substance which is introduced between all said surfaces on the one moulding and all said surfaces on the other moulding together with said strip-like electric conductors and said layers of heat-hardenable adhesive, said heat hardenable adhesive being a heat-hardenable resin.

6. A method as claimed in claim 4, wherein said sheets of fibrous material are impregnated and stuck together with a partially-cured thermosetting resin, and wherein said method further comprises passing electric current through said thin strip-like conductors to generate sufficient heat for a sufficient time fully to cure said thermosetting resin, and cooling the assemblage to a temperature below the boiling point of volatile products resulting from the curing of said thermosetting resin before releasing the pressure pressing said pairs of surfaces together.

7. A method as claimed in claim 6, wherein said sheets of fibrous material are impregnated with a thermosetting resin which is solid at normal room temperature but when heated first becomes fluid and then solidifies as curing takes place.

8. A method of assembling an assemblage comprising two fully cured heat-hardenable resin bonded mouldings, said mouldings each having a surface, which surfaces are to be adhesively jointed together to form the assemblage, which method comprises introducing between said surfaces a layer of heat-hardenable adhesive, and a solid film carrying at least one thin strip-like electric conductor, pressing said surfaces together, and causing an electric current to pass along said conductor to generate sufficient heat to harden said heat-hardenable adhesive, said solid film being composed of a material which disperses out of the joint between said surfaces when the joint is heated by said electric conductor.

9. A method as claimed in claim 8, wherein said solid film of material carries a plurality of thin strip-like electric conductors composed each of a ribbon of metal foil, said conductors being connected in parallel with each other and arranged so that none of the metal foil electric conductors crosses any one of the metal foil electric conductors, said metal foil electric conductors being all of substantially the same length and all of substantially the same resistance per unit length.

10. A method of assembling an assemblage comprising two fully cured heat hardenable resin bonded mouldings, said mouldings each having a surface, which surfaces are to be adhesively jointed together to form the assemblage, which method comprises introducing between said surfaces a layer of heat-hardenable resin substance and a sheet of thermo-plastic resin substance carrying at least one thin strip-like electric conductor, pressing said surfaces together, causing an electric current to pass along said thin strip-like conductor to generate sufficient heat for sufficient time to harden said heat-hardenable resin substance and cooling the assemblage to a temperature below the boiling point of volatile products resulting from the hardening of the heat-hardenable resin substance before releasing the pressure pressing said surfaces together.

11. An assemblage of two fully cured heat-hardenable resin bonded mouldings adhesively united together at a plurality of interfacing surfaces on the mouldings, and a plurality of thin strip-like electric conductors between said surfaces, said conductors being arranged with at least one conductor between each pair of interfacing surfaces and none of the conductors crossing any one of the conductors at any point.

12. An aerofoil comprising two fully cured heat-hardenable resin bonded mouldings adhesively united together with an adhesive comprising thermoset resin at a plurality of interfacing surfaces on the mouldings to form a cellular structure, and a plurality of thin strip-like metal foil electric conductors between said surfaces.

13. An aerofoil comprising two fully cured heat-hardenable resin bonded mouldings adhesively united together at a plurality of interfacing surfaces of the mouldings to form a cellular structure and a plurality of thin strip-like electric conductors between said interfacing surfaces, said conductors being arranged with at least one conductor between each pair of interfacing surfaces with none of the conductors crossing any one of the conductors at any point, said conductors being of substantially the same length and the same resistance per unit length.

14. An aerofoil comprising two fully cured heat-hardenable resin bonded mouldings adhesively united together with a thermoset resin bonding substance and a thermo-plastic resin substance at a plurality of interfacing surfaces on the mouldings to form a cellular structure, and a plurality of thin strip-like metal foil electric conductors between said surfaces.

15. An aerofoil as claimed in claim 14, wherein said metal foil electric conductors are arranged so that there is at least one conductor between each pair of interfacing surfaces, none of the conductors crossing any one of the conductors at any point, and said conductors being of substantially the same length and resistance per unit length.

References Cited in the file of this patent

UNITED STATES PATENTS

| | | |
|---|---|---|
| 2,241,312 | Luty | May 6, 1941 |
| 2,261,264 | Luty | Nov. 4, 1941 |
| 2,372,929 | Blessing | Apr. 3, 1945 |
| 2,393,100 | Gallay et al. | Jan. 15, 1946 |